United States Patent [19]
Kramer et al.

[11] 3,880,945
[45] Apr. 29, 1975

[54] PARAFFIN ISOMERIZATION IN SUPERCRITICAL FLUIDS

[75] Inventors: George M. Kramer, Berkeley Heights; Frederic Leder, Elizabeth, both of N.J.

[73] Assignee: Exxon Research and Engineering Company, Linden, N.J.

[22] Filed: July 18, 1973

[21] Appl. No.: 380,093

Related U.S. Application Data

[63] Continuation-in-part of Ser. No. 207,603, Dec. 13, 1971, abandoned, which is a continuation-in-part of Ser. No. 23,002, March 26, 1970, abandoned.

[52] U.S. Cl. ... 260/683.75; 260/683.7; 260/683.68; 260/683.66
[51] Int. Cl. ............................................. C07c 5/28
[58] Field of Search ..... 260/683.65, 683.68, 683.66, 260/683.7, 683.75

[56] References Cited
UNITED STATES PATENTS

| | | | |
|---|---|---|---|
| 2,249,366 | 7/1941 | van Peski et al | 260/683.7 |
| 2,265,548 | 12/1941 | Schuit | 260/683.75 |
| 2,271,043 | 1/1942 | van Peski | 260/683.66 |
| 2,318,226 | 5/1943 | Ibatieff et al | 260/683.68 |
| 2,403,107 | 7/1946 | McAllister et al | 260/683.75 |
| 3,674,681 | 7/1972 | Lyon | 260/683.65 |

*Primary Examiner*—Delbert E. Gantz
*Assistant Examiner*—G. J. Crasanakis
*Attorney, Agent, or Firm*—Marthe L. Gibbons

[57] ABSTRACT

A paraffin of 4–12 carbon atoms is isomerized with a Lewis acid catalyst and solvent comprising, for example, carbon dioxide, hydrogen chloride or hydrogen bromide at a temperature above the critical temperature of the mixture of said hydrocarbon and solvent, under pressure sufficient to impart a density of at least about one-tenth that of pure solvent (liquid), saturated at 20°C. The pressure is in the range of 1,000 to 5,000 psig. In a preferred embodiment, normal paraffins containing from 4 to 12 carbons are isomerized with an aluminum bromide catalyst in the presence of carbon dioxide at a temperature above the critical temperature of the mixture and a pressure sufficient to impart a density of at least one-tenth that of pure $CO_2$ liquid saturated with vapor at 20°C.

16 Claims, No Drawings ns. 3,880,945

PARAFFIN ISOMERIZATION IN SUPERCRITICAL FLUIDS

CROSS REFERENCE TO RELATED APPLICATIONS

This application is a continuation-in-part of U.S. application Ser. No. 207,603, filed on Dec. 13, 1971, now abandoned, which is a continuation-in-part of U.S. application Ser. No. 23,002, filed on Mar. 26, 1970, now abandoned.

BACKGROUND OF THE INVENTION

1. Field of the Invention

The instant invention relates to an improved process for the isomerization of hydrocarbons. More particularly, hydrocarbons are isomerized in the presence of a Lewis acid catalyst and a solvent such as carbon dioxide at a temperature above the critical temperature of the mixture of said hydrocarbon and solvent under pressure sufficient to impart a density of at least about one-tenth that of pure solvent liquid saturated at 20°C. In a preferred embodiment essentially normal paraffins containing from 4 to 12 carbons are isomerized with an aluminum bromide catalyst in the presence of carbon dioxide at a temperature above the critical temperature of the mixture and a pressure sufficient to impart at least 0.1 times the density of pure $CO_2$ liquid saturated with vapor at 20°C.

2. Discussion of the Prior Art

It is known in the prior art that normal straight chain paraffinic hydrocarbons can be isomerized by the use of a Friedel-Crafts catalyst, such as aluminum chloride or bromide. Further, it is known, as illustrated in U.S. Pat. No. 2,300,160, that carbon dioxide may be used to modify the activity of said Friedel-Crafts catalyst. It is further known that in isomerizing hydrocarbons it is desirable to increase the pressure of the isomerization reaction by use of inert diluent gases, such as carbon dioxide, to prevent boiling in the reactor. See, for example, U.S. Pat. No. 2,250,410 describing a homogeneous catalyst system and U.S. Pat. No. 2,265,548 describing a heterogeneous catalyst system.

In U.S. Pat. Nos. 2,250,410 and 2,300,160 care is taken to maintain the reaction conditions such that the operation is held below the critical temperature of the reactant mixture. In U.S. Pat. No. 2,265,548 the reaction may be run in the vapor or liquid phase, but the patentee suggests that when operating in the vapor phase a heterogeneous catalyst be utilized. Further, patentee does not recognize that by careful adjustment of temperature and pressure and judicious choice of catalyst, the catalyst may be dissolved in a supercritical fluid mixture. This is distinct from a normal liquid reaction in that by further adjustment of temperature and pressure an additional fluid phase may be caused to form which contains the major portion of the catalyst. In this way an isomerization process may be run in a cyclic fashion in which the catalyst is either miscible or immiscible with the reaction mixture, as conditions dictate.

SUMMARY OF THE INVENTION

It has now been unexpectedly discovered that an improved process for isomerizing hydrocarbons by use of Lewis acid catalysts is obtained by carrying out said isomerization process in the presence of a solvent such as $CO_2$ at a temperature above the critical temperature of the solvent-hydrocarbon mixture, and under pressure sufficient to impart a density of said mixture which is at least equal to 0.1 that of pure solvent saturated in its liquid state, at 20°C. It is noted that the Lewis acid may or may not be miscible in the solvent-hydrocarbon mixture dependent, in part, on the nature of the Lewis acid used. Thus, for example, $AlCl_3$ would be substantially immiscible in the reaction mixture under the conditions of the subject invention while $AlBr_3$ would be substantially miscible therein. The mixture in the above-described state may be defined as a supercritical gas (fluid) mixture which is characterized as having quasi-liquid characteristics. This supercritical gas mixture is homogeneous and, because of this homogeneous nature, all the advantages inherent in the usual homogeneous isomerization processes are obtained. However, there are certain advantages in using this supercritical gaseous state that are not possible in the homogeneous liquid state. For example, the supercritical gas mixture may comprise from 5% to 90% carbon dioxide dissolved therein. In the homogeneous liquid state, encountered in the usual isomerization process, only approximately 0.5% carbon dioxide is soluble in the liquid. Further, hydrogen, which is known to favorably modify the isomerization reaction, can be dissolved in the supercritical gas mixture quite easily, as opposed to its limited solubility in the usual homogeneous liquid isomerization process mixtures. More specifically, in a paraffin isomerization process a mixture of $CO_2$ and hydrogen quite effectively increases the selectivity to isomerized products as opposed to products resulting from cracking.

Solvents other than $CO_2$ may be used as the solvent for carbonium ion reactions. These compounds may be selected from the group consisting of polar and nonpolar compounds known to have critical temperatures between about −80° and 200°C, e.g. HBr, HCl, $SO_2$, $BF_3$, $BCl_3$, $CH_4$, ethane, propane, $H_2O$, NO, $N_2O$, $SO_2F_2$, low molecular weight fluorocarbons or halocarbons, and the rare gas elements, e.g. argon or xenon. Preferred solvents include HBr and HCl. In the case of HBr and HCl, the isomerization is conducted at a temperature above the critical temperature of the HBr or HCl — hydrocarbon mixture, and under pressure sufficient to impart a density of said mixture which is at least equal to 0.1 that of pure HBr or HCl, saturated in its liquid state, at 20°C.

Each of the various mixtures of hydrocarbon and solvent, e.g., carbon dioxide, have a critical temperature above which the mixture cannot be liquefied no matter how much pressure is exerted on said mixture. However, as said pressure is increased, the density of said mixture, which is a supercritical gaseous mixture, is increased and approaches and may even exceed that of said mixture in its liquid state. If the pressure is further increased, the said supercritical gaseous mixture is converted directly to a solid without going through a liquid phase. In the region defined as that wherein the supercritical gaseous mixture has a density of at least 0.1 that of pure $CO_2$, e.g. saturated, in its liquid state on up until said mixture is converted to a solid, it is possible to run homogeneous isomerization reactions. The advantages, as stated above, are that large amounts of $CO_2$ can be used in said homogeneous gaseous mixture thus acting as a solvent. More particularly, when isomerizing paraffins by use of aluminum bromide catalysts, the presence of the $CO_2$ acts to increase the selectivity of said isomerization process at conversions similar to the prior art process carried out under homogeneous liquid conditions.

This procedure is a general one and may be applied to all classes of isomerization reactions. More particularly, paraffins, naphthenes and aromatics can be isomerized by the process of this invention. Preferably, the feed for isomerization is paraffinic. More preferably, the feed is normal or isoparaffinic having from four to 12 carbons.

Naphthenes preferably having from six to 12 carbons may be isomerized by the instant process. Aromatics, preferably having from eight to 10 carbons, especially alkylaromatics such as ethylbenzene, orthoxylene, paraxylene, etc., may also be isomerized by the process of this invention. Multiringed alkylaromatics, preferably containing from 11 to 18 carbon atoms, such as α-methyl naphthalene, may be isomerized by the instant process.

Paraffinic and naphthenic feeds useful as feedstocks in the process of the instant invention are obtained by standard petroleum processing procedures. For example, they are readily obtained by distillation of crude petroleum feedstocks. The $C_5$ and $C_6$ cut produced in "reforming", a large petroleum process, can also serve as a source of paraffins and as a source of methylcyclopentane which can be isomerized to cyclohexane by the instant process.

The catalysts used for isomerization processes in general are characterized as strong acids. Lewis acid catalysts may be used as the strong acid catalyst. Specific examples of such Lewis acids include aluminum bromide, aluminum chloride, gallium trichloride, antimony pentafluoride, tantalum pentafluoride, niobium pentafluoride and boron trifluoride. Promoters useful in the instant process include water, hydrogen bromide, hydrogen chloride and hydrogen fluoride. The promoters are required only when the solvent is not a Bronsted acid, e.g. $CO_2$.

Preferably, aluminum bromide or aluminum chloride is used as the Lewis acid catalyst of the instant invention. The most preferred catalyst is aluminum bromide.

The Lewis acid catalyst will preferably have a molar concentration ranging from 0.01 to 10, more preferably from 0.1 to 0.5.

The hydrocarbon to be isomerized will comprise from 0.1 to 50 mole % of the total reaction mixture, preferably from 1 to 20 molar % of the reaction mixture. Carbon dioxide HBr or HCl will preferably comprise the remainder of the reaction mixture.

In certain specific instances, hydrogen might be added to suppress undesirable side reactions. In this case, the hydrogen will comprise from 0.1 to 10 mole % of the reaction mixture, preferably from 1 to 5 mole %.

Hydrogen has been known to inhibit cracking in paraffin isomerization reactions, but is not very soluble in paraffins at moderate pressures. The ability of hydrogen to be dissolved in the supercritical gaseous mixture of the instant invention results in utilization of a greater percentage of hydrogen and thus leads to more efficient control of side reactions.

The temperature at which the general hydrocarbon isomerization reaction is run is above the critical temperature of the mixture of the hydrocarbon solvent, e.g. $CO_2$, HCl or HBr, and, if utilized, hydrogen. Usually the reaction temperature will be from −80° to 200°C, preferably from 0° to 150°C.

When $CO_2$ is used as the solvent, the pressure will be adjusted so that the density of the mixture is at least 0.1 times, and preferably 0.3 times, that of liquid $CO_2$, saturated at 20°C. Of course, the pressure must be below that which converts the fluid system to a solid.

It is possible that at certain pressures or temperatures within the scope of the instant process, a solid phase may be present. However, so long as sufficient amounts of each component, e.g. hydrocarbon and $CO_2$ are in the supercritical gaseous mixture, the advantages of the instant process will be obtained. Further, the pressure and temperature may be varied to cyclically remove the catalyst or reaction products. Preferably, conditions will be adjusted so that no solid phase will be present.

The process of the instant invention may be applied to reactions other than isomerization. In general, any carbonium type reaction, i.e., alkylation, cracking, etc., may be run, with advantage, in the supercritical gas phase described previously.

In the preferred paraffin isomerization, the temperature at which the instant process will be run will vary depending on the particular paraffin to be isomerized, the Lewis acid catalyst, and the amount of solvent utilized. For each specific multi-component system there will be a temperature above which it will be impossible to condense the mixture into a liquid phase by use of pressure. This particular temperature may easily be determined by placing the mixture of interest, that is hydrocarbon, Lewis acid, hydrogen halide, if desired, $CO_2$ and hydrogen, if desired, in a high pressure sight glass with variable volume or pressurizing equipment and slowly varying the temperature and pressure of the system until critical opalescence is observed. In general, in the case of paraffinic isomerization the temperature of the reaction will range from 0° to 180°C, preferably from 15° to 90°C, and most preferably from 25° to 80°C.

As in the general hydrocarbon isomerization process, the pressure of the paraffin isomerization process will be adjusted so that the density of the homogeneous supercritical gas phase is approximately greater than one-tenth, preferably greater than 0.3, that of the density of liquid $CO_2$ at 20°C and saturated with vapor. In the case of HBr or HCl, the pressure of the paraffin isomerization process will be adjusted so that the density of the homogeneous supercritical gas phase is approximately greater than one-tenth, preferably greater than 0.3, that of the density of liquid HBr or HCl, respectively, at 20°C. and saturated with vapor. The upper limiting pressure is that pressure at which the mixture is converted to a solid. In general, the pressure in the case of paraffinic isomerization with an aluminum bromide catalyst will be from 1,000 to 5,000 psi, more preferably from 1,000 to 2,500 psi.

The process of the instant invention may also be utilized for isomerizing unsaturated hydrocarbon bonds such as are present in monoolefins and unconjugated polyolefins. For example, 1,4-pentadiene may be conveniently converted to 1,3-pentadiene by the instant process. Preferably, the monoolefins and nonconjugated olefins are selected from the group consisting of hydrocarbons having from four to 20 carbon atoms.

The process of the instant invention may be carried out in process equipment known in the art, with consideration given to the pressures and temperatures at which the process will be practiced.

The following are specific embodiments of the instant invention.

EXAMPLE 1

In this example, the isomerization of normal hexane in the presence of $CO_2$ and in the supercritical gaseous phase was compared to the isomerization of normal hexane in the liquid homogeneous phase. The catalyst used in both places was aluminum bromide. A further modification of the catalyst comprised the use of a promoter, methyl t-amylether. The procedure used was that normal hexane, aluminum bromide and methyl t-amylether were introduced into the reactor. The temperature was adjusted and the $CO_2$ was pumped in under pressure. In Run No. 2, samples were taken from the bottom and top of the reactor and checked for consistency. Both samples were similar thus demonstrating that a homogeneous gaseous phase was formed. The density of this reaction mixture was ~40 lbs./ft$^3$, which may be compared to the density of pure $CO_2$ in the liquid state at 20°C, ~50 lbs./ft$^3$. Conversion in both cases was similar; however, in Run 2 the selectivity of the isomerization reaction over the cracking increased by a factor of 5.

TABLE I

|  | Run 1 | Run 2 |
|---|---|---|
| n-Hexane: gm. | 172 | 86 |
| AlBr$_3$ | 30 | 15 |
| Methyl tertiary amylether | .12 | .06 |
| H$_2$, gm. | – | – |
| CO$_2$, gm. | – | 500 |
| Temperature, °C. | 40 | 40 |
| Reaction Time, minutes | 60 | 60 |
| Isomerization: Cracking | 1:1 | 4 or 5:1 |
| nC$_6$ Conversion, % as Determined by Gas Chromatography | 30 | 35 |

EXAMPLE 2

The above procedure was repeated in Example 2, except that hydrogen was added to the system to determine its effect on the suppression of undesirable cracking reactions. After more than 10 hours at high temperature, more than 90% isomerization had occurred and the selectivity had been much improved. The isomerization-cracking ratio was now 50/1 which can be compared with the value of 4–5/1 obtained at lower temperature without hydrogen, Table 1.

TABLE II

|  | Run 3 |
|---|---|
| n-Hexane: gm. | 86 |
| AlBr$_3$: gm. | 15 |
| Methyl tertiary amylether, gm. | .06 |
| H$_2$, gm. | 1.0 |
| CO$_2$, gm. | 500 |
| Temperature, °C. | 80–150 |
| Reaction Time, minutes | 600 |
| Isomerization: Cracking | 50:1 |
| nC$_6$Conversion, % as Determined by Gas Chromatography | 90 |

EXAMPLE 3

A mixture of n-hexane and methyl cyclopentane was isomerized under conditions similar to those of Example 1, except for changes noted in Table III below. The results show that the conversion of methylcyclopentane to cyclohexane takes place more rapidly than the conversion of n-hexane to isomerized products.

TABLE III

|  | Run 4 |
|---|---|
| n-Hexane: gm. | 86 |
| Methylcyclopentane: gm. | 6 |
| AlBr$_3$: gm. | 15 |
| Methyl tertiary amylether, gm. | 1 |
| H$_2$, psi | 150 |
| CO$_2$, gm. | 2000 |
| Temperature, °C. | 150 |
| Reaction Time, minutes | 20 |
| n-Hexane conversion, % as determined by gas chromatography | 33.4 |
| Product Distribution |  |
| Hexane fraction, % vol. (based on hexane fraction) |  |
| 2,2-Dimethyl butane | 1.4 |
| 2,3-Dimethyl butane + 2-Methyl pentane | 22.5 |
| 3-Methyl pentane | 9.5 |
| n-hexane | 66.6 |
| Cycloalkane Fraction, % vol. (based on cycloalkane fraction) |  |
| Methylcyclopentane | 50 |
| Cyclohexane | 50 |

EXAMPLE 4

This data demonstrates the effectiveness of an AlCl$_3$-HCl catalyst system. In a typical experiment, i.e. No. 5, solid AlCl$_3$ was added to a 300 ml autoclave with care taken to minimize exposure to air. The autoclave was closed and H$_2$ was added at ambient temperature. The autoclave was then heated to run conditions, e.g. 60°C, and the premixed feed which was held in a charging bomb was pressured into the reactor with HCl. The HCl used was pumped through a bed of conventional drying agent into the unit until a pressure of 2,040 psig was reached. The autoclave was stirred and samples were withdrawn periodically.

The samples were analyzed by gas chromatography using a 300 foot × 0.01 inch DC550 coated capillary column. The column temperature was 50°C, helium was the carrier-gas and the G.C. was Perkin Elmers Model 900 operated in conjunction with a flame ionization detector.

Runs 5–8 indicate that n-hexane can be isomerized in the supercritical HCl environment. Comparing Runs 7 and 8, it is seen that the catalyst activity is increased by the mere addition of AlCl$_3$ to the reactor, i.e., there is 82% isomerization with 5 gm AlCl$_3$ in 3.3 hours and only 7.4% isomerization with 1 gm AlCl$_3$ in 4.6 hours. Run 7 resulted in faster isomerization than Runs 5–6 which had still more AlCl$_3$ present and suggests that an optimum HCl/AlCl$_3$ ratio may exist.

TABLE IV

| Run | 5 | 6 | 7 | 8 |
|---|---|---|---|---|
| Feed |  |  |  |  |
| n-Hexane, gm | 43 | 43 | 43 | 43 |
| Methylcyclo-pentane, gm | 2 | 2 | 2 | 2 |
| Catalyst |  |  |  |  |
| AlCl$_3$, gm | 13 | 13 | 5 | 1 |
| HCl, gm (calc) | 46 | 46 | 46 | 46 |
| P, psig-total | 2040 | 2400 | 2050 | 2050 |
| PH$_2$, psig | 300 | 300 | 300 | 300 |
| T°C | 60 | 80 | 80 | 81 |

TABLE IV-Continued

| | | | | |
|---|---|---|---|---|
| Reactor Vol, ml | 300 | 300 | 300 | 300 |
| Run Period, Hr | 0–6 | 6–27 | 3.3 | 4.6 |
| Sample Time, Hr | 6 | 27 | 3.3 | 4.6 |
| Hexane Isom, % | 29 | 90 | 82 | 7.4 |
| Product Distribution % (vol) | | | | |
| 2,2-dimethyl butane | 2 | 32 | 24 | 0.3 |
| 2,3-dimethyl butane + 2-methyl pentane | 20 | 42 | 42 | 5.1 |
| 3-methyl pentane | 7 | 15 | 16 | 2.0 |
| n-hexane | 71 | 10 | 18 | 92.6 |

EXAMPLE 5

These runs were conducted in a similar fashion to the runs in Example 4. The data demonstrate the effectiveness of $AlBr_3$-HBr in the process of the subject invention and indicate the increased activity of the catalyst vis-a-vis the $AlCl_3$-HCl system discussed in Example 4.

TABLE V

| Run | 9 | 10 |
|---|---|---|
| Feed | | |
| n-Hexane, gm | 40 | 43 |
| Methylcyclopentane, gm | 4 | 2 |
| Catalyst | | |
| $AlBr_3$, gm | 26 | 14 |
| HBr, gm (calc) | 71 | 72 |
| P, psig, total | 1500 | 1675 |
| $PH_2$, psig | 100 | 300 |
| T°C | 100 | 113 |
| Reactor Vol, ml | 300 | 300 |
| Run Period, min | 7 | 11 |
| Sample time, min | 7 | 11 |
| Hexane Isom. % | 85 | 91 |
| Product Distribution, % (vol) | | |
| 2,2-dimethylbutane | 31 | 38 |
| 2,3-dimethylbutane + 2-methylpentane | 39 | 39 |
| 3-methylpentane | 15 | 14 |
| n-hexane | 15 | 9 |

What is claimed is:

1. An improved process for isomerizing hydrocarbons comprising a paraffin containing from four to 12 carbon atoms, said process comprises subjecting said paraffin to the action of a Lewis acid catalyst and a solvent selected from the group consisting of $CO_2$, HBr and HCl at a temperature above the critical temperature of the mixture of said paraffin and said solvent, said temperature being in the range of 0° to 180°C, and at a pressure sufficient to impart to said mixture a density of at least one-tenth that of said solvent liquid, saturated at 20°C, said pressure ranging from 1,000 to 5,000 psig.

2. The process of claim 1 wherein said Lewis acid catalyst is selected from the group consisting of aluminum bromide, aluminum chloride, gallium trichloride, gallium tribromide, antimony pentafluoride, tantalum pentafluoride, niobium pentafluoride and boron trifluoride.

3. The process of claim 2 wherein said Lewis acid catalyst further comprises a promoter selected from the group consisting of water, hydrogen bromide, hydrogen chloride, and hydrogen fluoride or mixtures thereof and wherein said solvent is $CO_2$.

4. The process of claim 2 wherein said Lewis acid catalyst is aluminum bromide.

5. The process of claim 4 wherein a promoter is utilized with said aluminum bromide catalyst, said promoter being selected from the group consisting of water and hydrogen bromide and wherein said solvent is $CO_2$.

6. The process of claim 2 wherein said Lewis acid catalyst has a molar concentration ranging from .01 to 10% of said mixture.

7. The process of claim 2 wherein said paraffin has a molar concentration ranging from 0.1 to 50% of said mixture.

8. The process of claim 2 wherein said mixture further includes hydrogen.

9. The process of claim 8 wherein said hydrogen comprises from 0.1 to 10 mole percent of said mixture.

10. The process of claim 1 wherein said temperature ranges between 15° and 90°C.

11. The process of claim 1, wherein said temperature ranges between 25° and 80°C.

12. The process of claim 1 wherein said pressure ranges between 1,000 and 2,500 psig.

13. The process of claim 1 wherein said hydrocarbon comprises hexane.

14. The process of claim 1 wherein said hydrocarbon-solvent mixture is further characterized by being a supercritical fluid mixture under said conditions of temperature and pressure and wherein said Lewis acid catalyst is essentially insoluble.

15. The process of claim 1 wherein said hydrocarbon-solvent mixture is further characterized by being a supercritical fluid mixture under said conditions of temperature and pressure and wherein said Lewis acid catalyst is essentially soluble.

16. The process of claim 1 wherein said hydrocarbon comprises 0.1 to 50 mole percent of said mixture and wherein said solvent comprises the remainder of said mixture.

* * * * *